United States Patent
Thomas et al.

(10) Patent No.: US 9,648,057 B2
(45) Date of Patent: *May 9, 2017

(54) METHODS AND SYSTEMS FOR COLLABORATIVE REMOTE APPLICATION SHARING AND CONFERENCING

(71) Applicant: Calgary Scientific Inc., Calgary (CA)

(72) Inventors: Monroe Milas Thomas, Calgary (CA); Matthew James Stephure, Calgary (CA); Sam Anthony Leitch, Calgary (CA); Daniel Angelo Pigat, Calgary (CA)

(73) Assignee: Calgary Scientific Inc., Calgary, AB (CA)

( * ) Notice: Subject to any disclaimer, the term of this patent is extended or adjusted under 35 U.S.C. 154(b) by 444 days.

This patent is subject to a terminal disclaimer.

(21) Appl. No.: 13/682,243

(22) Filed: Nov. 20, 2012

(65) Prior Publication Data
US 2013/0132485 A1    May 23, 2013

Related U.S. Application Data

(60) Provisional application No. 61/563,256, filed on Nov. 23, 2011, provisional application No. 61/623,131, filed on Apr. 12, 2012.

(51) Int. Cl.
*H04L 29/06* (2006.01)
*H04L 12/18* (2006.01)

(52) U.S. Cl.
CPC ........ *H04L 65/403* (2013.01); *H04L 12/1822* (2013.01)

(58) Field of Classification Search
CPC ... H04L 65/403; H04L 12/1822; H04L 12/12; H04L 67/1095; H04L 67/42; G06T 15/00;
(Continued)

(56) References Cited

U.S. PATENT DOCUMENTS

| | | |
|---|---|---|
| 5,249,121 A | 9/1993 | Baum |
| 5,996,002 A | 11/1999 | Katsurabayashi et al. |

(Continued)

FOREIGN PATENT DOCUMENTS

| | | |
|---|---|---|
| CA | 2646414 | 10/2007 |
| CA | 2697936 | 3/2009 |

(Continued)

OTHER PUBLICATIONS

Luo et al., "Real time multi-user interaction with 3D graphics via communication networks", Jul. 1998, 1998 IEEE Conference on Information Visualization.*

(Continued)

*Primary Examiner* — Vivek Srivastava
*Assistant Examiner* — Todd L Barker
(74) *Attorney, Agent, or Firm* — Meunier Carlin & Curfman LLC

(57) ABSTRACT

Systems and method for providing a collaborative conferencing capability to an application remotely-accessed by client computing devices. A client media sharing application is provided in a client tier, and the client media sharing application allows at least one of the client computing devices to share media with the client computing devices. A conferencing manager application that receives the shared media is provided to the server tier. The conferencing manager application makes the shared media available to the client computing devices.

11 Claims, 14 Drawing Sheets

(58) Field of Classification Search
CPC ..... G06T 19/00; G06T 2219/024; G06F 9/00; G06F 9/44; G06F 9/54; G06F 3/038; G06F 3/1454; G06F 19/00; G06F 9/52; G06Q 10/10
USPC ...................................................... 709/205
See application file for complete search history.

(56) References Cited

U.S. PATENT DOCUMENTS

| | | | |
|---|---|---|---|
| 6,151,621 A * | 11/2000 | Colyer | G06Q 10/10 345/2.1 |
| 6,342,906 B1 * | 1/2002 | Kumar | G06F 3/1454 709/201 |
| 6,602,185 B1 | 8/2003 | Uchikubo | |
| 6,662,210 B1 | 12/2003 | Carleton et al. | |
| 6,698,021 B1 | 2/2004 | Amini et al. | |
| 6,742,015 B1 * | 5/2004 | Bowman-Amuah | G06F 8/20 709/223 |
| 6,763,371 B1 | 7/2004 | Jändel | |
| 6,938,212 B2 | 8/2005 | Nakamura | |
| 6,981,062 B2 | 12/2005 | Suryanarayana | |
| 6,996,605 B2 | 2/2006 | Low et al. | |
| 7,003,550 B1 | 2/2006 | Cleasby et al. | |
| 7,133,895 B1 | 11/2006 | Lee et al. | |
| 7,152,092 B2 | 12/2006 | Beams et al. | |
| 7,191,233 B2 | 3/2007 | Miller | |
| 7,197,561 B1 | 3/2007 | Lovy et al. | |
| 7,254,634 B1 | 8/2007 | Davis et al. | |
| 7,287,054 B2 | 10/2007 | Lee et al. | |
| 7,346,616 B2 | 3/2008 | Ramanujam et al. | |
| 7,356,563 B1 | 4/2008 | Leichtling et al. | |
| 7,363,342 B1 | 4/2008 | Wang et al. | |
| 7,533,146 B1 | 5/2009 | Kumar | |
| 7,624,185 B2 | 11/2009 | Miller | |
| 7,676,506 B2 | 3/2010 | Reinsch | |
| 7,810,089 B2 | 10/2010 | Sundarrajan et al. | |
| 7,950,026 B1 | 5/2011 | Urbach | |
| 7,984,115 B2 | 7/2011 | Tien et al. | |
| 8,010,901 B1 | 8/2011 | Rogers | |
| 8,065,166 B2 | 11/2011 | Maresh et al. | |
| 8,122,341 B1 | 2/2012 | Dayan et al. | |
| 8,195,146 B2 * | 6/2012 | Prakash | H04L 67/125 455/419 |
| 8,239,773 B1 | 8/2012 | Billman | |
| 8,478,307 B1 | 7/2013 | Hayes | |
| 8,527,591 B2 | 9/2013 | Pirnazar | |
| 8,856,259 B2 | 10/2014 | Burckart et al. | |
| 8,909,703 B2 * | 12/2014 | Gupta | G06Q 10/10 709/204 |
| 8,935,328 B2 * | 1/2015 | Tumuluri | G06T 19/20 709/204 |
| 2001/0037358 A1 | 11/2001 | Clubb et al. | |
| 2002/0051541 A1 | 5/2002 | Glick et al. | |
| 2003/0179230 A1 * | 9/2003 | Seidman | G06F 3/1454 715/750 |
| 2004/0045017 A1 | 3/2004 | Dorner et al. | |
| 2004/0249885 A1 | 12/2004 | Petropoulakis et al. | |
| 2005/0114711 A1 | 5/2005 | Hesselink et al. | |
| 2005/0114789 A1 | 5/2005 | Chang et al. | |
| 2005/0154288 A1 | 7/2005 | Wang | |
| 2005/0193062 A1 | 9/2005 | Komine et al. | |
| 2005/0246422 A1 | 11/2005 | Laning | |
| 2006/0041891 A1 | 2/2006 | Aaron | |
| 2006/0053380 A1 | 3/2006 | Spataro et al. | |
| 2006/0069797 A1 | 3/2006 | Abdo et al. | |
| 2006/0085245 A1 | 4/2006 | Takatsuka et al. | |
| 2006/0112188 A1 | 5/2006 | Albanese et al. | |
| 2006/0179119 A1 | 8/2006 | Kurosawa et al. | |
| 2006/0221081 A1 | 10/2006 | Cohen et al. | |
| 2006/0242254 A1 | 10/2006 | Okazaki et al. | |
| 2007/0143398 A1 | 6/2007 | Graham | |
| 2007/0244930 A1 | 10/2007 | Bartlette et al. | |
| 2007/0244962 A1 | 10/2007 | Laadan et al. | |
| 2008/0028323 A1 | 1/2008 | Rosen et al. | |
| 2008/0052377 A1 | 2/2008 | Light | |
| 2008/0195362 A1 | 8/2008 | Belcher et al. | |
| 2008/0301228 A1 | 12/2008 | Flavin | |
| 2008/0320081 A1 | 12/2008 | Shriver-Blake et al. | |
| 2009/0070404 A1 | 3/2009 | Mazzaferri | |
| 2009/0094369 A1 | 4/2009 | Wooldridge et al. | |
| 2009/0106422 A1 | 4/2009 | Kriewall | |
| 2009/0172100 A1 | 7/2009 | Callanan et al. | |
| 2009/0187817 A1 | 7/2009 | Ivashin et al. | |
| 2010/0017727 A1 | 1/2010 | Offer et al. | |
| 2010/0115023 A1 | 5/2010 | Peled | |
| 2010/0131591 A1 | 5/2010 | Thomas et al. | |
| 2010/0274858 A1 | 10/2010 | Lindberg et al. | |
| 2010/0306642 A1 | 12/2010 | Lowet et al. | |
| 2011/0047190 A1 | 2/2011 | Lee et al. | |
| 2011/0058052 A1 | 3/2011 | Bolton et al. | |
| 2011/0119716 A1 | 5/2011 | Coleman, Sr. | |
| 2011/0128378 A1 | 6/2011 | Raji | |
| 2011/0154302 A1 | 6/2011 | Balko et al. | |
| 2011/0187652 A1 | 8/2011 | Huibers | |
| 2011/0191438 A1 | 8/2011 | Huibers et al. | |
| 2011/0191823 A1 | 8/2011 | Huibers | |
| 2011/0219419 A1 | 9/2011 | Reisman | |
| 2012/0072833 A1 | 3/2012 | Song et al. | |
| 2012/0159308 A1 | 6/2012 | Tseng et al. | |
| 2012/0159356 A1 | 6/2012 | Steelberg | |
| 2012/0210242 A1 | 8/2012 | Burckart et al. | |
| 2012/0210243 A1 | 8/2012 | Uhma et al. | |
| 2012/0233555 A1 * | 9/2012 | Psistakis | G06Q 10/101 715/751 |
| 2012/0331061 A1 * | 12/2012 | Lininger | G06F 17/5004 709/205 |
| 2013/0046815 A1 | 2/2013 | Thomas et al. | |
| 2013/0120368 A1 * | 5/2013 | Miller | G06T 15/00 345/419 |
| 2013/0159709 A1 | 6/2013 | Ivory et al. | |
| 2013/0208966 A1 | 8/2013 | Zhao et al. | |
| 2013/0297676 A1 | 11/2013 | Binyamin | |
| 2014/0258441 A1 | 9/2014 | L'Heureux et al. | |

FOREIGN PATENT DOCUMENTS

| | | |
|---|---|---|
| CA | 2742779 | 6/2010 |
| CN | 1499841 | 5/2004 |
| EP | 1015068 | 4/2008 |
| JP | 2004206363 | 7/2004 |
| WO | 98/25666 | 6/1998 |
| WO | 01/91482 | 11/2001 |
| WO | 2008/011063 | 1/2008 |
| WO | 2012/093330 | 7/2012 |
| WO | 2013/046015 | 4/2013 |
| WO | 2013/046016 | 4/2013 |
| WO | 2013/072764 | 5/2013 |
| WO | 2014/033554 | 3/2014 |

OTHER PUBLICATIONS

Shim et al., "Providing Flexible Services for Managing Shared State in Collaboratiave Systems", 1997, "Proceedings of the Fifth European Conference", pp. 237-252.*
Hong et al., "Multimedia Presentation Authoring and Virtual Collaboration in Medicine", Dec. 2010, International Journal of Kimics, vol. 8, No. 6 (7 pages total).*
International Preliminary Report on Patentability and Written Opinion, dated Feb. 17, 2015, received in connection with related International Application No. PCT/IB2013/002776.
Conference Schedule for ADASS XXI, European Southern Observatory, http://wwvv.eso.org/sci/meetings/2011/adass2011/program/schedule.html#day2, Nov. 7, 2011, 4 pages.
GoInstant shared web technology, http://website.s3/goinstant.com,s3.amazonaws.com/wp-content/content/uploads/2012/04/GoInstant-Shared-Web-Technology.pdf, 2012, 4 pages.
Press Release, Calgary Scientific Revolutionizes Application Sharing and Advanced Collaboration with PureWeb 3.0, Jun. 21, 2011, 3 pages.
Samesurf web real-time co-browser application, http://i.samesurf.com/i/0586021, 2009.

(56) References Cited

OTHER PUBLICATIONS

International Search Report and Written Opinion, dated May 17, 2013, in connection with International Application No. PCT/IB2012/002842.

International Search Report and Written Opinion, dated Feb. 12, 2013, in connection with International Application No. PCT/IB2012/002417.

International Search Report and Written Opinion, dated Jan. 30, 2013, in connection with International Application No. PCT/IB2012/001935.

International Search Report and Written Opinion, dated Jan. 23, 2013, in connection with International Application No. PCT/IB2012/001931.

International Search Report and Written Opinion, dated May 16, 2012, in connection with International Application No. PCT/IB2012/000009.

Federl, Pavol, "Remote Visualization of Large Multi-dimensional Radio Astronomy Data Sets," Institute for Space Imaging Science, University of Calgary, 2012, 22 pages.

Yang, Lili, et al., "Multirate Control in Internet-Based Control Systems," IEEE Transactions on Systems, Man, and Cybernetics: Part C: Applications and Reviews, vol. 37, No. 2, 2007, pp. 185-192.

International Search Report and Written Opinion, dated Jun. 9, 2014, received in connection with International Application No. PCT/IB2013/002776.

International Preliminary Report on Patentability, dated May 27, 2014, received in connection with International Application No. PCT/IB2012/002417.

European Search Report, dated Jun. 12, 2014, received in connection with European Application No. 12731899.6.

Supplementary European Search Report, dated Apr. 10, 2015, received in connection with European Application No. 12837201.8.

Li, S-F, et al., "Integrating synchronous and asynchronous collaboration with virtual network computing," Internet Computing, IEEE 4.3, 2000, pp. 26-33.

Layers: Capture Every Item on Your Screen as a PSD Layered Image, Internet Website, retrieved on Jun. 30, 2016 at http://web.archive.org/web/20140218111143, 2014, 9 pages.

International Search Report and Written Opinion, dated Jul. 8, 2016, received in connection with International Patent Application No. PCT/IB2016/051856.

Office Action, dated Nov. 7, 2016, received in connection with JP Patent Application No. 2014542944. (and English Translation).

Office Action and Search Report, dated Oct. 9, 2016, received in connection with CN Patent Application No. 201280057759.2. (and English Translation).

Office Action, dated Oct. 3, 2016, received in connection with JP Patent Application No. 2014532492. (and English Translation).

\* cited by examiner

US 9,648,057 B2

METHODS AND SYSTEMS FOR COLLABORATIVE REMOTE APPLICATION SHARING AND CONFERENCING

CROSS-REFERENCE TO RELATED APPLICATIONS

This application claims the benefit of U.S. Provisional Patent Application No. 61/563,256, filed on Nov. 23, 2011, entitled "Methods and Systems for Collaborative Remote Application Sharing and Conferencing," and U.S. Provisional Patent Application No. 61/623,131, filed on Apr. 12, 2012, entitled "Methods and Systems for Collaborative Remote Application Sharing and Conferencing," the disclosures of which are expressly incorporated herein by reference in their entireties.

BACKGROUND

Ubiquitous remote access to services, application programs and data has become commonplace as a result of the growth and availability of broadband and wireless network access. As such, users are accessing application programs and data using an ever-growing variety of client devices (e.g., mobile devices, table computing devices, laptop/notebook/desktop computers, etc.). Data may be communicated to the devices from a remote server over a variety of networks including, 3G and 4G mobile data networks, wireless networks such as WiFi and WiMax, wired networks, etc. Clients may connect to a server offering the services, applications programs and data across many disparate network bandwidths and latencies.

In such an environment, applications may also be shared among remote participants in a collaborative session. However, when collaborating, participants may be limited solely to the functionalities provided by the shared application, thus limiting the collaborative session. Specifically, participants may be limited because they are unable to share media, i.e., audio, video, desktop screen scrapes, image libraries, etc., with other participants in the collaborative session.

SUMMARY

Disclosed herein are systems and methods for providing a collaborative conferencing capability to a remotely-accessed application. A method of providing a collaborative conferencing capability to a remotely-accessed application may include providing a tiered remote access framework comprising an application tier, a server tier and a client tier, the tiered remote access framework communicating first information regarding the remotely-accessed application between client computing devices accessing the remotely-accessed application within a state model that is used to display the remotely-accessed application at the client computing devices; providing a server remote access application in the server tier, the server remote application being capable of modifying the state model; providing a client remote access application in either the client tier or the application tier; providing a client media sharing application in the client tier, the client media sharing application allowing at least one of the client computing devices to share media with the client computing devices; providing a conferencing manager application to the server tier, the conferencing manager application receiving the shared media; and modifying the state model to further include the shared media such that the shared media is provided in at least one of the client computing devices.

In another implementation, a method of providing a collaborative conferencing capability may include providing a tiered remote access framework comprising a server tier and a client tier, the tiered remote access framework communicating information regarding shared media between client computing devices accessing the shared media within a state model that is used to display the shared media at the client computing devices; providing a server remote access application in the server tier, the server remote application being capable of modifying the state model; providing a client media sharing application in the client tier, the client media sharing application allowing at least one of the client computing devices to share the shared media with the client computing devices; providing a conferencing manager application to the server tier, the conferencing manager application receiving the shared media; and modifying the state model to further include the shared media such that the shared media is provided in at least one of the client computing devices.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. While implementations will be described for remotely accessing applications, it will become evident to those skilled in the art that the implementations are not limited thereto, but are applicable for remotely accessing any type of data or service via a remote device.

Figure 1:
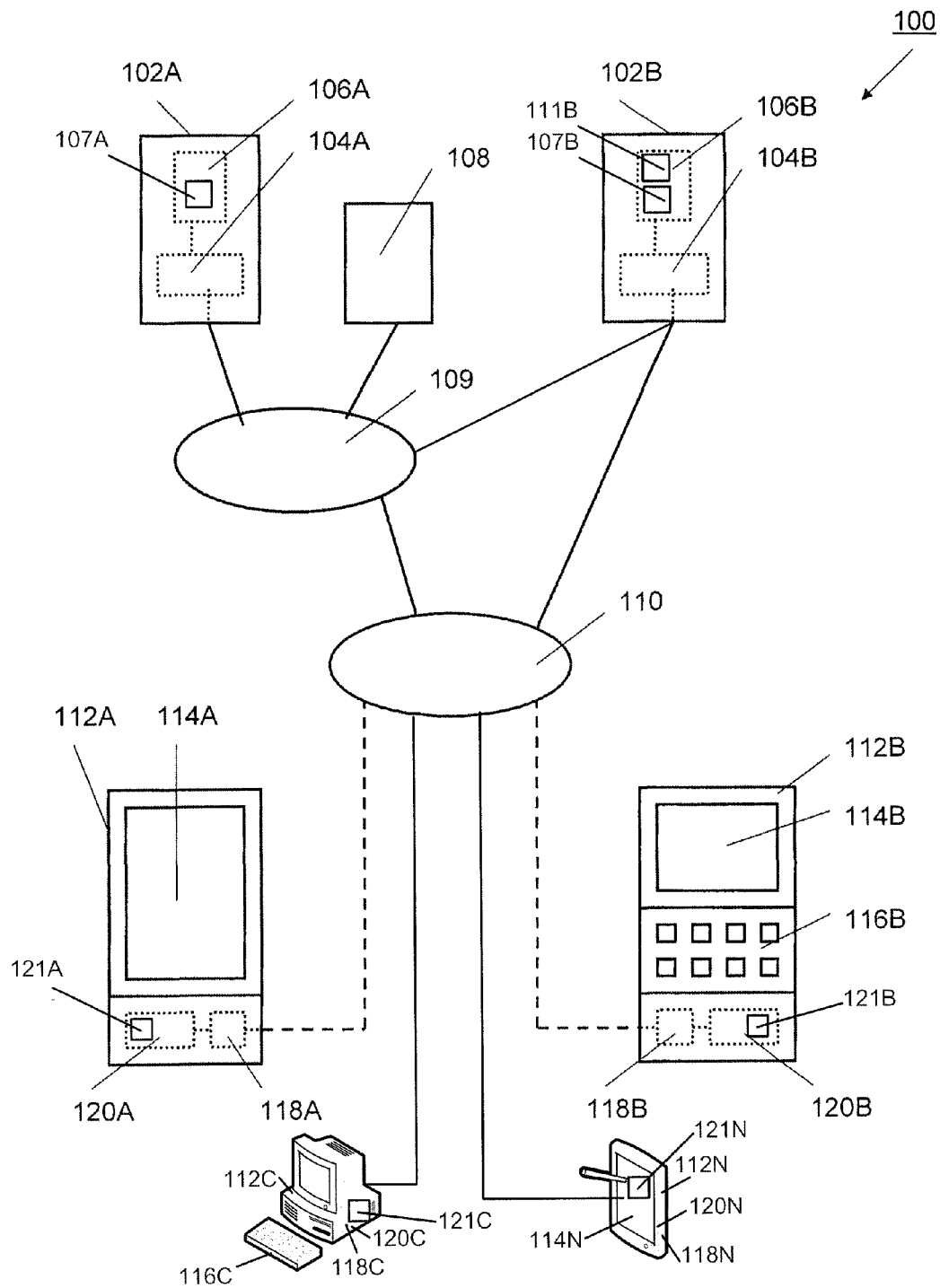
FIG. 1 is a simplified block diagram illustrating a system for providing remote access to an application at a remote device via a computer network.

Referring to FIG. 1, a system 100 for providing remote access to an application, data or other service via a computer network. The system comprises a client computer 112A or 112B, such as a wireless handheld device such as, for example, an IPHONE 112A or a BLACKBERRY 112B connected via a computer network 110 such as, for example, the Internet, to a server 102B. Similarly, the client computing devices may also include a desktop/notebook personal computer 112C or a tablet device 112N that are connected by the communication network 110 to the server 102B. It is noted that the connections to the communication network 110 may be any type of connection, for example, Wi-Fi (IEEE 802.11x), WiMax (IEEE 802.16), Ethernet, 3G, 4G, etc.

The server 102B is connected, for example, via the computer network 110 to a Local Area Network (LAN) 109 or may be directly connected to the computer network 110. For example, the LAN 109 is an internal computer network of an institution such as a hospital, a bank, a large business, or a government department. Typically, such institutions still use a mainframe computer 102A and a database 108 connected to the LAN 109. Numerous application programs 107A may be stored in memory 106A of the mainframe computer 102A and executed on a processor 104A. Similarly, numerous application programs 107B may be stored in memory 106B of the server 102B and executed on a processor 104B. The application programs 107A and 107B may be "services" offered for remote access. The mainframe computer 102A, the server 102B and the client computers 112A, 112B, 112C or 112N may be implemented using hardware such as that shown in the general purpose computing device of FIG. 12.

A client remote access application 121A, 121B, 121C, 121N may be designed for providing user interaction for displaying data and/or imagery in a human comprehensible fashion and for determining user input data in dependence upon received user instructions for interacting with the application program using, for example, a graphical display with touch-screen 114A or a graphical display 114B/114N and a keyboard 116B/116C of the client computers 112A, 112B, 112C, 112N, respectively. For example, the client remote access application is performed by executing executable commands on processor 118A, 118B, 118C, 118N with the commands being stored in memory 120A, 120B, 120C, 120N of the client computer 112A, 112B, 112C, 112N, respectively.

Alternatively or additionally, a user interface program is executed on the server 102B (as one of application programs 107B) which is then accessed via an URL by a generic client application such as, for example, a web browser executed on the client computer 112A, 112B. The user interface is implemented using, for example, Hyper Text Markup Language HTML 5. In some implementations, the server 102B may participate in a collaborative session with the client computing devices 112A, 112B, 112C . . . 112N. For example, the aforementioned one of the application programs 107B may enable the server 102B to collaboratively interact with the application program 107A or another application program 107B and the client remote access applications 121A, 121B, 121C, 121N. As such, the server 102B and each of the participating client computing devices 112A, 112B, 112C . . . 112N may present a synchronized view of the display of the application program.

Figure 2:
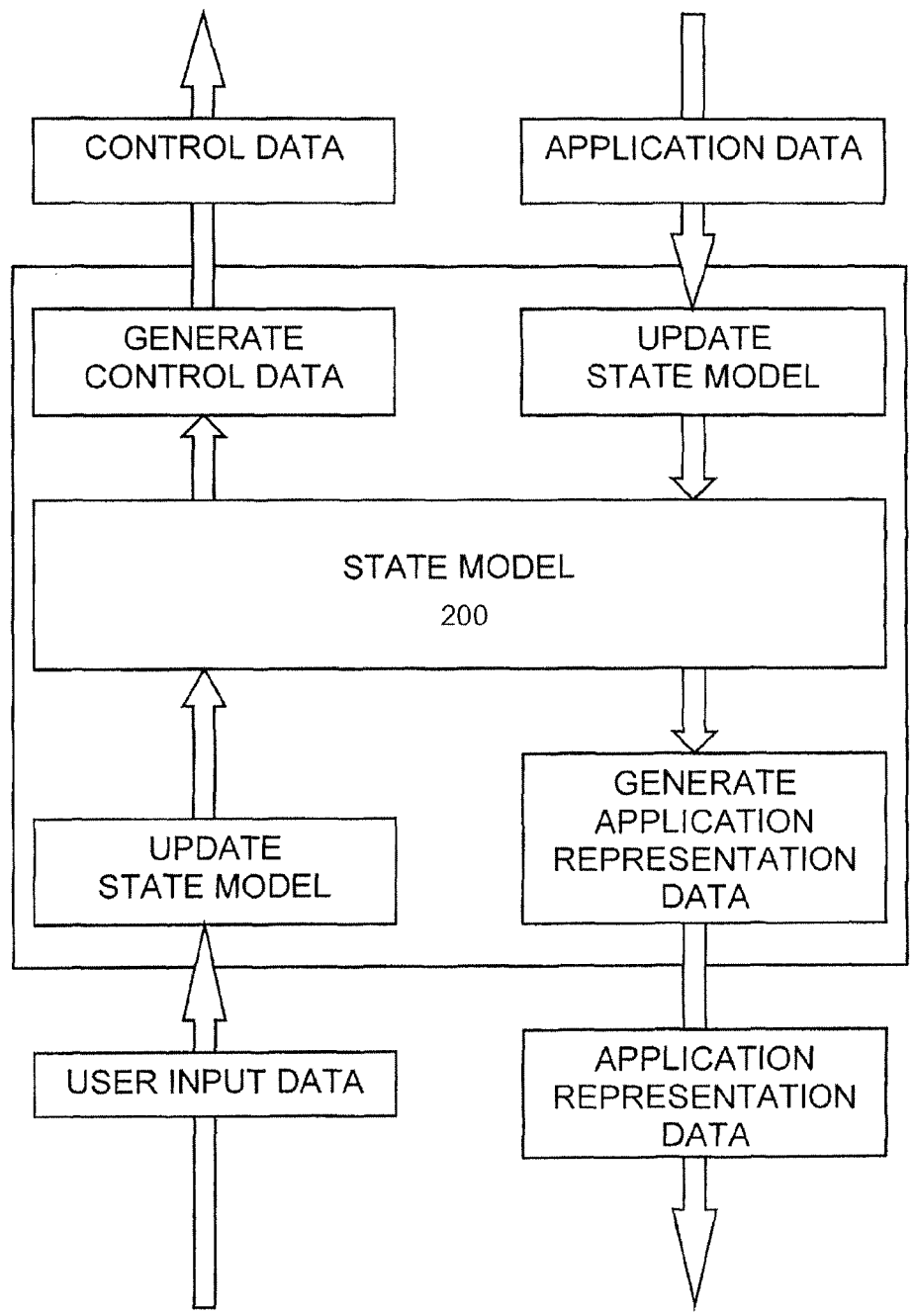
FIG. 2 is a state model in accordance with the present disclosure.

The operation of a server remote access application 111B with the client remote access application (any of 121A, 121B, 121C, 121N, or one of application programs 107B) is performed in cooperation with a state model 200, as illustrated in FIG. 2. An example of the server remote access program is PUREWEB, available from Calgary Scientific, Alberta, Canada. When executed, the client remote access application updates the state model 200 in accordance with user input data received from a user interface program. The remote access application may generate control data in accordance with the updated state model 200, and provide the same to the server remote access application 111B running on the server 102B.

Upon receipt of application data from an application program 107A or 1097B, the server remote access application 111B updates the state model 200 in accordance with the screen or application data, generates presentation data in accordance with the updated state model 200, and provides the same to the client remote access application 121A, 121B, 121C, 121N on the client computing device. The state model 200 comprises an association of logical elements of the application program with corresponding states of the application program, with the logical elements being in a hierarchical order. For example, the logical elements may be a screen, a menu, a submenu, a button, etc. that make up the application program user interface. This enables the client device, for example, to natively display the logical elements. As such, a menu of the application program that is presented on a mobile phone will look like a native menu of the mobile phone. Similarly, the menu of the application program that is presented on desktop computer will look like a native menu of the desktop computer operating system.

The state model 200 is determined such that each of the logical elements is associated with a corresponding state of the application program 107A or 107B. The state model 200 may be determined such that the logical elements are associated with user interactions. For example, the logical elements of the application program are determined such that the logical elements comprise transition elements with each transition element relating a change of the state model 200 to one of control data and application representation data associated therewith.

In some implementations, two or more of the client computing devices 112A, 112B, 112C . . . 112N and/or the server 102B may collaboratively interact with the application program 107A or 107B. As such, by communicating state information between each of the client computing devices 112A, 112B, 112C . . . 112N and/or the server 102B and/or the mainframe computer 102A participating in a collaborative session, each of the participating client computing devices 112A, 112B, 112C . . . 112N may present a synchronized view of the display of the application program 107A or 107B.

In accordance with some implementations, the system 100 may provide for decoupled application extensions. Such extensions are provided as part of the server remote access application 111B (e.g., as a plug-in), the client remote access applications 121A, 121B, 121C, 121N (e.g., as part of a client software development kit (SDK)), one of the applications 107B (e.g., as part of a server SDK), or combinations thereof to provide features and functionalities that are otherwise are not provided by the application programs 107A or 107B. These are described more fully with regard to FIG. 4, below. These features and functionalities may be provided without a need to modify the application programs 107A or 107B, as they are integral with the remote access applications. As such, the decoupled application extensions are agnostic to the application itself, i.e., the application extensions do not depend on the application being displayed within the server remote access application 111B and client remote access application 121A, 121B, 121C, 121N. Further, the application extensions may be made available within controls presented by the server remote access application 111B or client remote access application 121A, 121B, 121C, 121N, and may be always available.

For example, an "interactive digital surface layer" may be provided as an application extension to enable participants in a collaborative session to make annotations on top of the application running in the session. The interactive digital surface layer functions like a scribble tool to enable a user to draw lines, arrows, symbols, scribbles, etc. on top of an application to provide collaboration of both the application and the interactive digital surface layer. As will be described below with reference to FIGS. 4A and 4B, the interactive digital surface layer is available as a control within the environment of FIG. 1.

Figure 3:
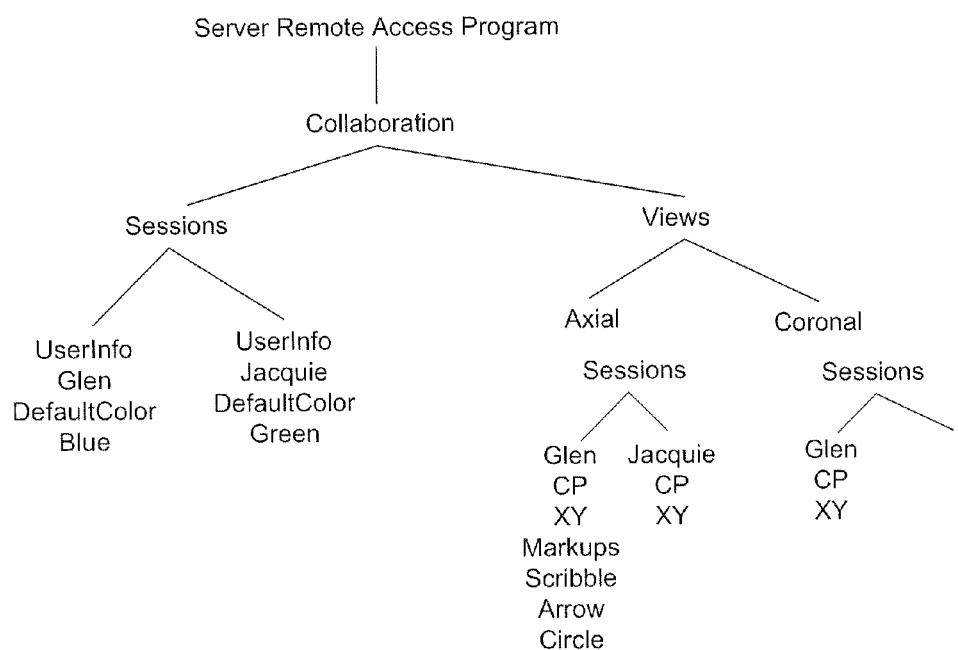
FIG. 3 illustrates a tree within an XML state model document.

FIG. 3 illustrates a tree within an XML state model document that describes a decoupled application extension, such as the interactive digital surface layer, which may be implemented in conjunction with aspects of the present disclosure. The implementation of the interactive digital surface layer (or "acetate layer") is described in U.S. Provisional Patent Application No. 61/541,540 and U.S. patent application Ser. No. 13/632,245, which are incorporated herein by reference in their entireties. Within the XML tree, there is a collaboration node defined that includes one or more sessions. The sessions are associated with the application extensions, such as the interactive digital surface layer. The participants in the sessions are identified by a UserInfo tag, and may be, for example Glen and Jacquie. Each participant is assigned a default color (DefaultColor) to represent the user's annotations within the interactive digital surface layer (e.g., blue for Glen and green for Jacquie). Any displayable color may be selected as a default color for participants to the collaborative session. A prioritization of colors may be defined, such that a first user is assigned blue, a second user is assigned green, a third user is assigned orange, etc.

Under the collaboration node there are also one or more views defined. In the example of FIG. 3, Glen and Jacquie may be collaborating within a medical imaging application. As such, there may be two views defined—an axial view and a coronal view. Sessions are associated with each of the views, where the sessions include the users to the collaboration. For the axial view, Glen's session has associated therewith a cursor position (CP) and certain markups, e.g., a scribble, arrow and circle. In the axial view, Jacquie has an associated cursor position, but since she has not made any markups to the interactive digital surface layer, there is no additional information associated with Jacquie's axial session view. Under the coronal session, each user only has a cursor position associated therewith.

The above information is displayed by the client remote access application, which may be displayed on a client computing device associated with Glen and Jacquie, respectively. For example, Glen may be viewing the application on a client computing device such as a laptop, which has a mid-sized display. As such, Glen is able to view both the axial view and the coronal view at the same time. In contrast, Jacquie may be viewing the application on a smaller computing device, such as a handheld wireless device. As such, only the axial view may be presented due to the more limited display area of such a device.

Below is an example section of a state model 200 in accordance with the tree of FIG. 3. The state model 200 may be represented by, e.g., an Extensible Markup Language (XML) document. Other representations of the state model 200 may be used. Information regarding the application program and interactive digital surface layer is communicated in the state model 200. Because the interactive digital surface layer is decoupled from the application, the information regarding the interactive digital surface layer is not part of the application state (i.e., it is abstracted from the application). Rather, the interactive digital surface layer information is separately maintained in the state model 200.

```
<ApplicationState >
    <Screens>
        <Screen id="0" name="Axial">
            <Fields>
                <Field name="name" description="Name" default="">
                <Type fieldType="Text" maxChars="128" />
                <Validation />
                </Field>
            </Fields>
        </Screen>
        <Screen id="1" name=" Coronal" />
    </Screens>
    <Screen Data>
        <CurrentScreen id="0" />
        <Screen id="0">
        </Screen>
    </ScreenData>
</ApplicationState>
<Collaboration>
    <Sessions>
        <UserInfo="Glen" DefaultColor="Blue" />
        <UserInfo="Jacquie" DefaultColor="Green" />
    </Sessions>
    <Views>
        <Axial>
            <Sessions>
                <UserName="Glen" CP="XY"
                Markups="Scribble Arrow Circle" />
                <UserName="Jacquie" CP="XY"/>
            </Sessions>
        </Axial>
        <Coronal>
            <Sessions>
                <UserName="Glen" CP="XY" />
                <UserName="Jacquie" CP="XY"/>
            </Sessions>
        </Coronal>
    </Views>
</Collaboration>
```

Information regarding the application (107A or 107B) is maintained in the ApplicationState node in a first portion of the XML state model. Different states of the application program associated with the axial view and the coronal view are defined, as well as related triggers. For example, in the axial view a "field" is defined for receiving a name as user input data and displaying the same. The decoupled collaboration states and application extension states (e.g., interactive digital surface layer) are maintained in a second portion of the XML document.

The state model 200 may thus contain session information about the application itself, the application extension information (e.g., interactive digital surface layer), information about views, and how to tie the annotations to specific views (e.g., scribble, arrow, circle tied to axial view).

Figure 4:
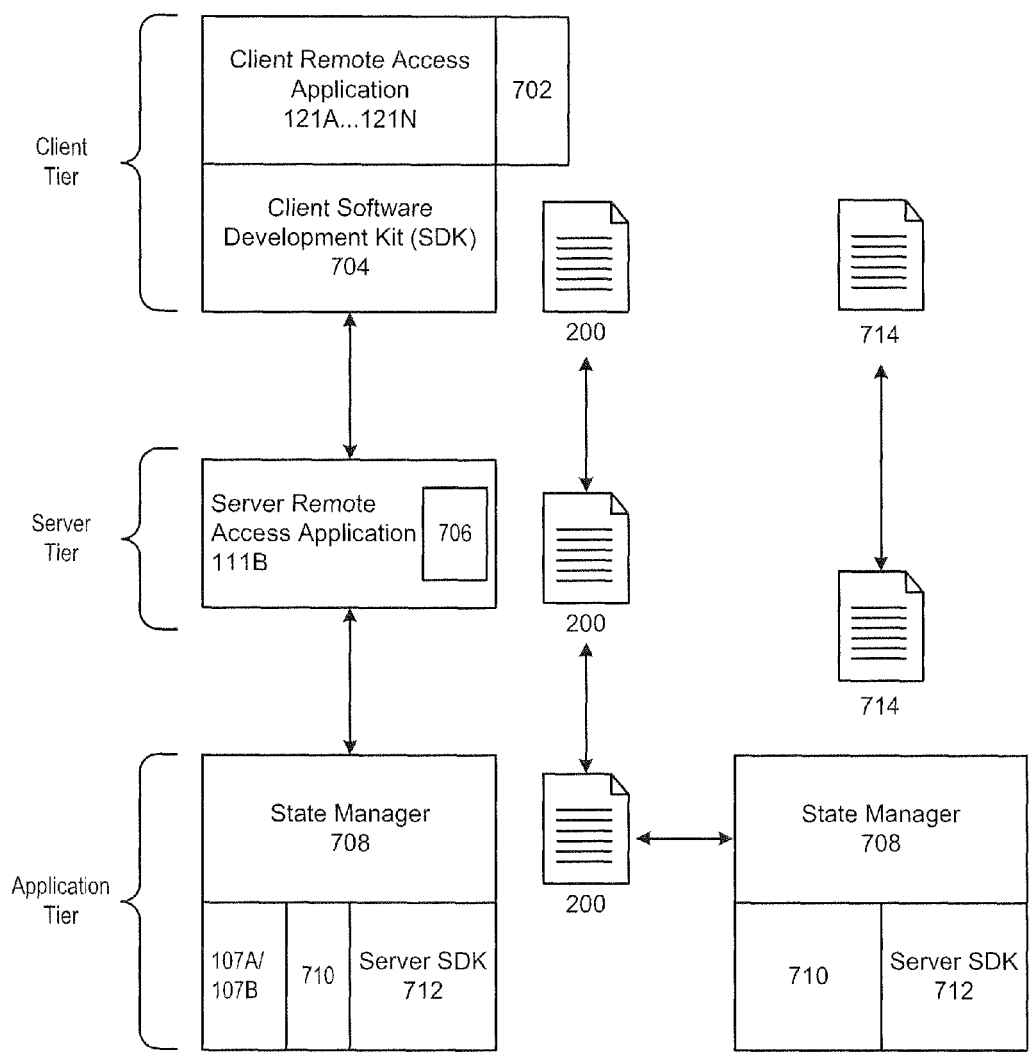
FIG. 4 illustrates additional aspects of the system of FIG. 1.

FIG. 4 illustrates aspects of the system 100 of FIG. 1 in greater detail. FIG. 4 illustrates the system 100 as having a tiered software stack. The client remote application 121A, 121B, 121C, 121N may sit on top of a client software development kit (SDK) 704 in a client tier. The client tier communicates to the server remote access application 111B in a server tier. The server tier communicates to a state manager 708 sitting on top of the applications 107A/107B and a server SDK 712 in an application tier. As noted above, the application extensions may be implemented in any of the tiers, i.e., within the server tier as a plug-in 706, the client tier as client application extension 702, the application tier as application extension 710, or combinations thereof. The state model 200 is communicated among the tiers and may be modified in any of the tiers by the application extensions 702 and 710, and the plug-in 706.

In yet another example, in the application tier, the application extension 710 may be a separate executable program that includes new business logic to enhance the applications 107A/107B. The application extension 710 may consume the state model 200 and produce its own document 714 (i.e., a state model of the application extension 710) that may include: (1) information from the state model 200 and information associated with the application extension 710, (2) only information associated with the application extension 710, or (3) a combination of some of the state model information and information associated with the application extension 714. The state model 714 may be communicated to the server remote access application 111B, where the server remote access application 111B may compose an updated state model 200 to include the information in the state model 714. Alternatively or additionally, the client remote access application 121A, 121B, 121C, 121N may receive both the state model 200 and the state model 714, and the client remote access application may compose an updated state model 200 to include the information in the state model 714.

Figure 5A:
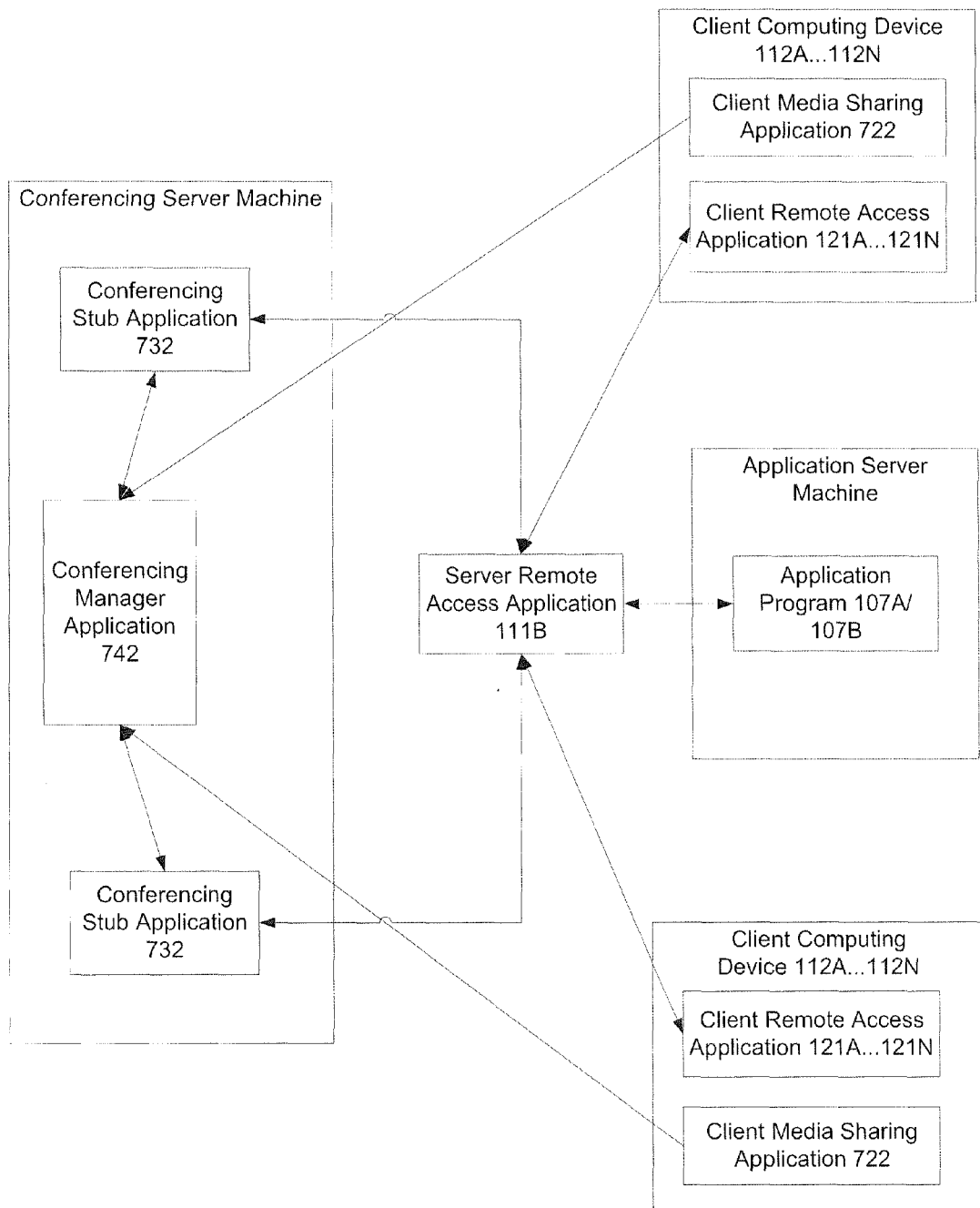
FIG. 5A is a simplified block diagram illustrating systems for providing conferencing around a remotely-accessed application program.

FIG. 5A is a simplified block diagram illustrating a system for providing conferencing around a remotely-accessed application program. As discussed above, participants in a collaborative session may be limited to interacting solely with the shared, remotely-accessed application, i.e., participants may be unable to interact with various media stored on, or accessed by, the client computing devices 112A, 112B, 112C or 112N of other participants. However, according to the implementation illustrated in FIG. 5A, a participant may be capable of sharing various media such as, for example, video, audio, desktop screen scrapes, text messages, libraries of images, etc., with other participants in the collaborative session.

The system of FIG. 5A includes the client computing devices 112A, 112B, 112C and/or 112N, an application server machine (i.e., the server 102B or the mainframe computer 102A) and the server remote access application 111B, which runs on the server 102B, as discussed with regard to FIGS. 1, 2 and 4. As discussed above, the server remote access application 111B provides access to one or more application programs 107A/107B, which is displayed by the client remote access applications 121A, 121B, 121C or 121N. Operation of the server remote access application 111B with the client remote access application 121A, 121B, 121C or 121N or one of the application programs 107A/107B is performed in cooperation with the state model 200. According to the above implementations, each of the client computing devices 112A, 112B, 112C or 112N participating in the collaborative session may present a synchronized view of the applications programs 107A/107B by communicating the state model 200 between each of the client computing devices 112A, 112B, 112C or 112N and/or the server 102B and/or the mainframe computer 102A.

In order to provide conferencing capability, i.e., share various media with the other participants in a collaborative session, FIG. 5A also includes a conferencing server machine having a conferencing stub application 732 and a conferencing manager application 742. In some implementations, the conferencing stub application 732 and the conferencing manager application 742 may run on the server 102B. A sharing component of the conferencing capability may be optional, and may be initiated by a participant downloading, but not installing, a client media sharing application 722 using the client computing device 112A, 112B, 112C or 112N. However, if the client remote access application 121A, 121B, 121C or 121N is running in a restricted sandbox environment, such as a web browser that does not have access to system resources to collect sharable media, or is not sharing any media, then the participant may not download the client media sharing application 722, but will be unable to share various media with the other participants in the collaborative system. Instead, the participant will be limited to solely viewing the remotely-accessed application program 107A/107B and/or various media shared by other participants in the collaborative session. In some implementations, the client media sharing application 722 may be incorporated into the client remote access application 121A, 121B, 121C or 121N.

The system of FIG. 5A allows the participant that acquires conferencing capability to share media, such as video, audio, desktop screen scrapes, text messages, libraries of images, etc. with other participants in the collaborative session. The conferencing server machine may receive the shared media either directly from the client media sharing application 722 or indirectly from the client remote access application 121A, 121B, 121C or 121 via the conferencing stub application 732. Additionally, a plurality of different participants can provide shared media, which may be simultaneously displayed by the other client computing devices 112A, 112B, 112C or 112N.

In one implementation, the conferencing stub application 732 is a server application (e.g., a plug-in 706) enabled to communicate with the server remote access application 111B. The conferencing stub application 732, however, may not included collaborative features, such as, for example the features that allow the client computing devices 112A, 112B, 112C or 112N to collaboratively interact with the application program 107A/107B. Thus, the conferencing stub application 732 may not be shared by the participants in the session (via the state model 200). Accordingly, in this implementation, there is one conferencing stub application 732 for each client computing device 112A, 112B, 112C or 112N connected to the conferencing server machine. In another implementation, the conferencing manager application 742 is a server application enabled to communicate with the server remote access application 111B, and the functionality of the conferencing stub application 732 exists entirely within the conferencing manager application 742. Further, in yet another implementation, the conferencing manager application 742 is a server application enabled to communicate with the server remote access application 111B, and the conferencing stub application 732 becomes a hybrid client/server, where the conferencing stub application 732 is a server with respect to the client computing devices 112A, 112B, 112C or 112N and a client with respect to the conferencing server machine.

During a collaborative session, as discussed above, the client remote access application 121A, 121B, 121C or 121N operates with the server remote access application 111B in cooperation with the state model 200 to interface with the application program 107A/107B. Similarly, during a conferencing session, the client remote access application 121A, 121B, 121C or 121N operates with the server remote access application 111B in cooperation with the state model 200 to interface with conferencing manager application 742, via the conferencing stub application 732. For example, the conferencing manager application 742 acts as a multiplexer by making shared media received from one client computing device 112A, 112B, 112C or 112N (either directly or indirectly, as discussed above) available to the conferencing stub application 732 of each of the other client computing devices 112A, 112B, 112C or 112N. Specifically, the conferencing stub application 732 and the client remote access application 121A, 121B, 121C or 121N coordinate how various media streams may be reprocessed, elided, combined, re-sampled, etc. before transmission from the conferencing stub application 732 to the client remote access application 121A, 121B, 121C or 121N. For example, the conferencing stub application 732 may mix two or more available audio streams into a single audio stream in order to reduce the bandwidth requirements.

Figure 5B:
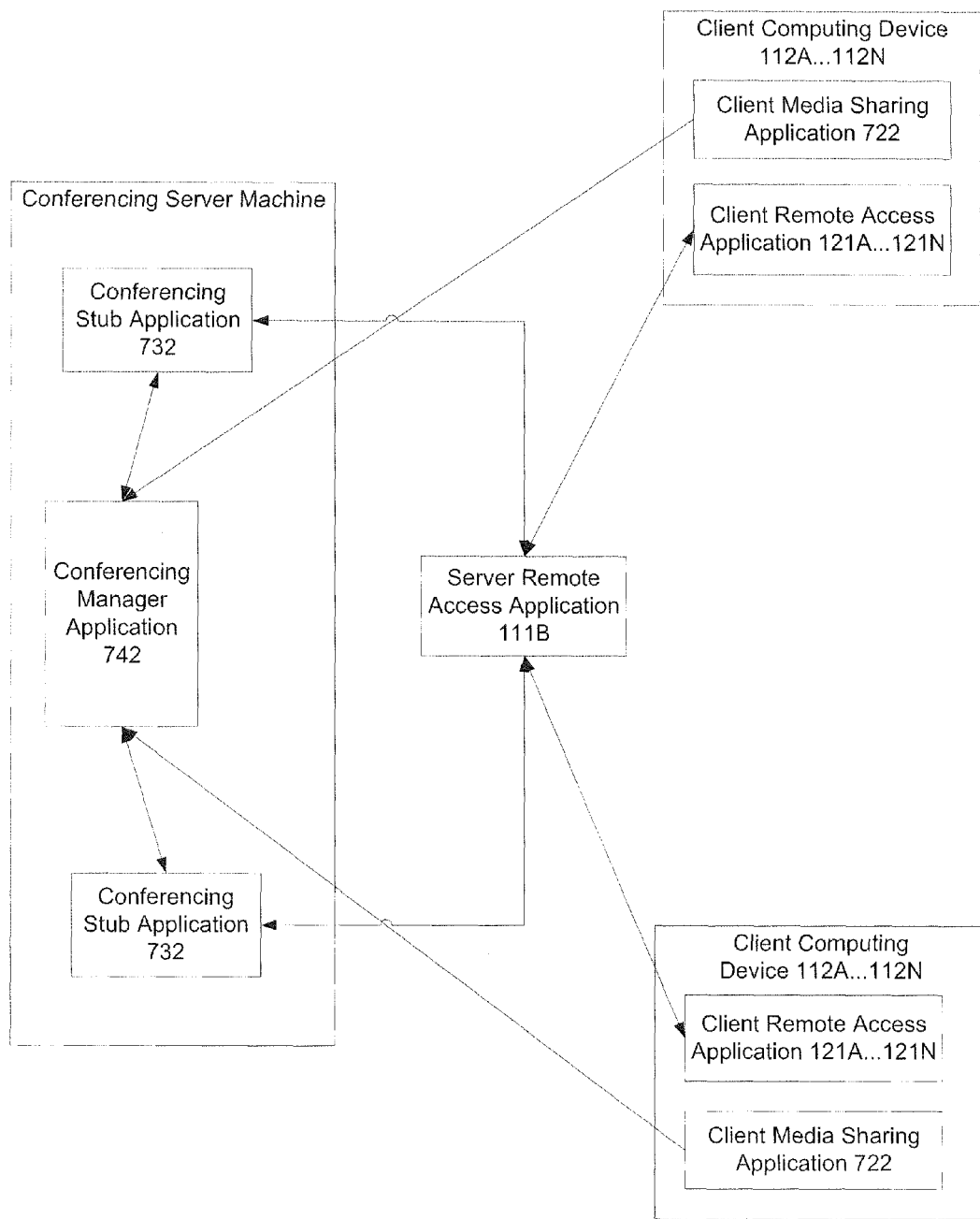
FIG. 5B is a simplified block diagram illustrating systems for providing conferencing in a remote environment.

FIG. 5B is a simplified block diagram illustrating systems for providing conferencing in a remote environment. The features in common between FIGS. 5A and 5B are labeled with the same reference numbers. As discussed above with regard to FIG. 5A, conferencing is provided around a remotely-accessed application program 107A/107B. However, in FIG. 5B, conferencing is provided in a remote environment without requiring collaboration around the application program 107A/107B. In this implementation, the client remote access application 121A, 121B, 121C or 121N operates with the server remote access application 111B in cooperation with the state model 200 to interface with conferencing manager application 742, via the conferencing stub application 732, during the conferencing session in the same manner as discussed above.

Figure 6A:
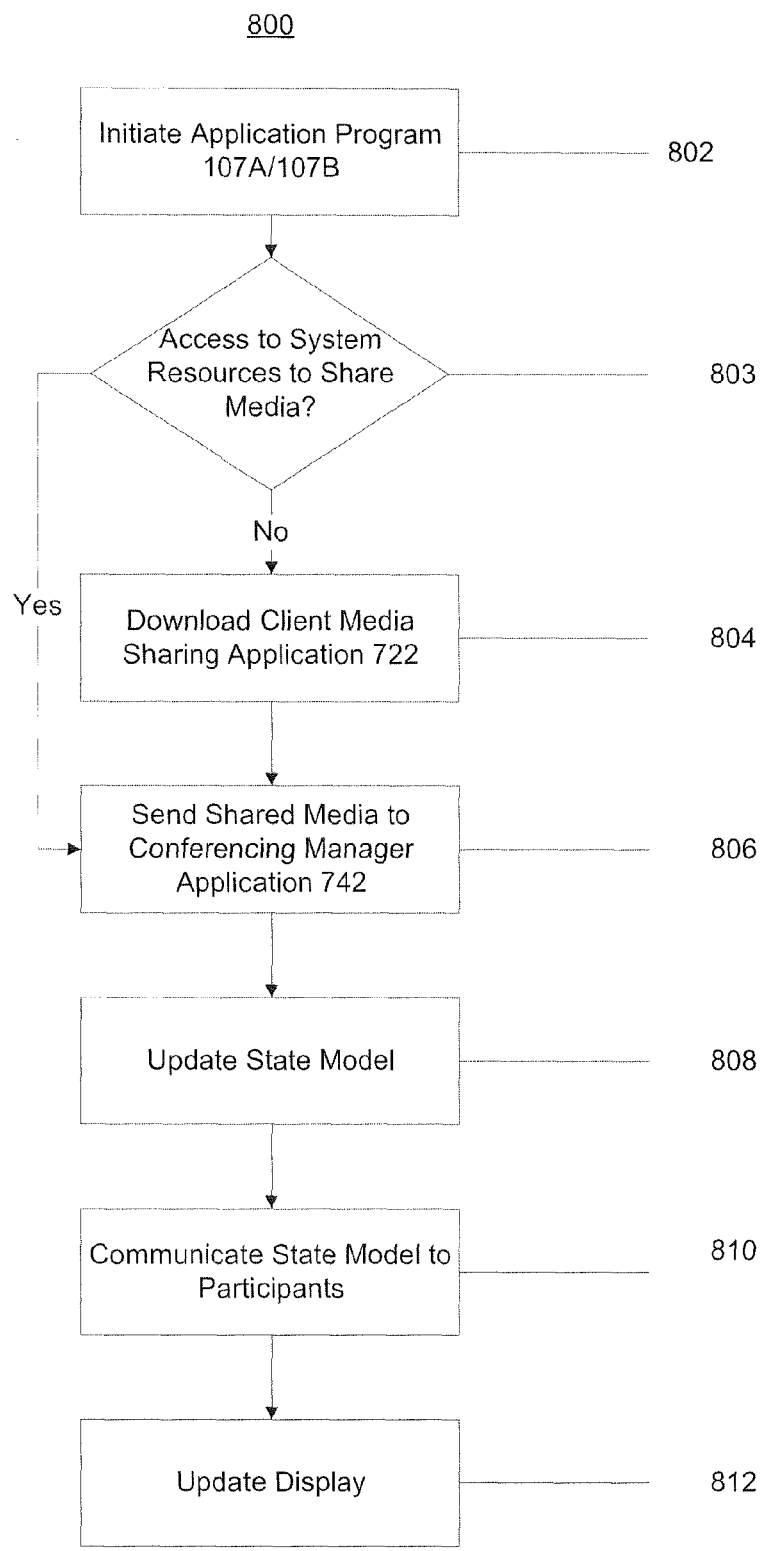
FIGS. 6A-B illustrates flow diagrams of example operations performed within the systems of FIGS. 5A-B.

FIG. 6A illustrates a flow diagram 800 of example operations performed within the system of FIG. 5A. At 802, the application program 107A/107B is remotely accessed. As discussed above, for example, the server remote access application 111B provides access to one or more application programs 107A/107B, which is displayed by the client remote access application 121A, 121B, 121C or 121N. At 803, the client computing device 112A, 112B, 112C or 112N determines whether it has access to system resources to share media. If NO, the process skips to step 804, discussed below, in order to acquire conferencing capability. If YES, the state model 200 is updated, and then the process skips to step 806, discussed below.

At 804, in order to acquire conferencing capability, the participant may download the client media sharing application 722 using the client computing device 112A, 112B, 112C or 112N. The client media sharing application 722 allows the participant to share various media with the other participants in a collaborative session.

At 806, the participant provides the shared media to the conferencing server machine either directly using the client media sharing application 722 or indirectly using the client remote access application 121A, 121B, 121C or 121N via the conferencing stub application 732. In one implementation, a plurality of different participants can provide shared media, which may be simultaneously displayed by the client computing devices 112A, 112B, 112C or 112N. At 808, the client remote access application 121A, 121B, 121C or 121N operates with the server remote access application 111B in cooperation with the state model 200 to interface with conferencing manager application 742, via the conferencing stub application 732. For example, upon receipt of the shared media from one client computing device 112A, 112B, 112C or 112N by the conferencing manager application 742, the conferencing manager application 742 makes the shared media available to each conferencing stub application 732 of the other client computing devices 112A, 112B, 112C or 112N. Then, the server remote access application 111B updates the state model 200.

At 810, the server remote access application 111B generates presentation data in accordance with the updated state model 200 and provides the same to the client remote access application 121A, 121B, 121C, 121N on the client computing device. At 812, the client remote access application 121A, 121B, 121C, 121N updates the display of the client computing device 112A, 112B, 112C or 112N.

Figure 6B:
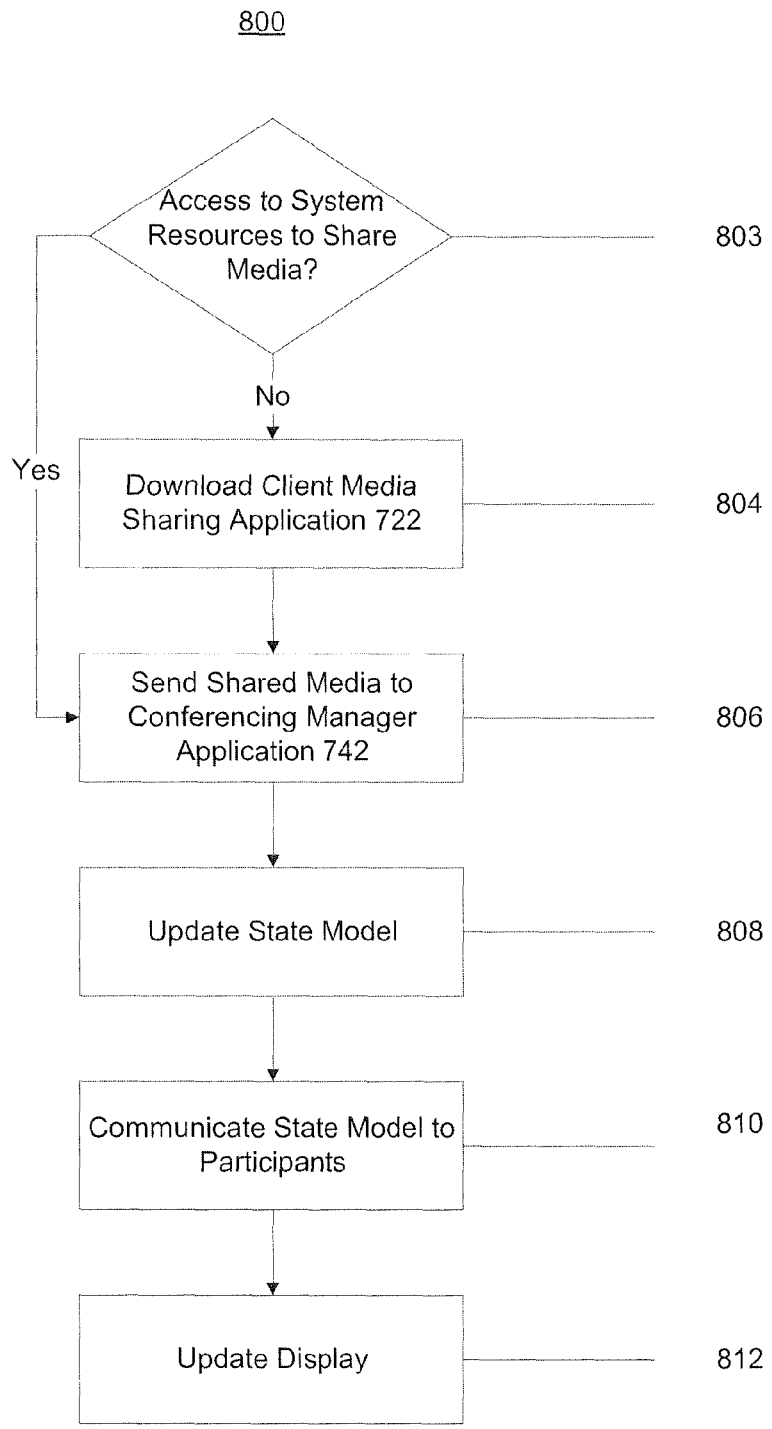

FIG. 6B illustrates a flow diagram 800 of example operations performed within the system of FIG. 5B. The features in common between FIGS. 6A and 6B are labeled with the same reference numbers. The example operations of FIG. 6B differ from the example operations of FIG. 6A in that the application program 107A/107B is not required to be initiated to begin conferencing.

Figure 7:
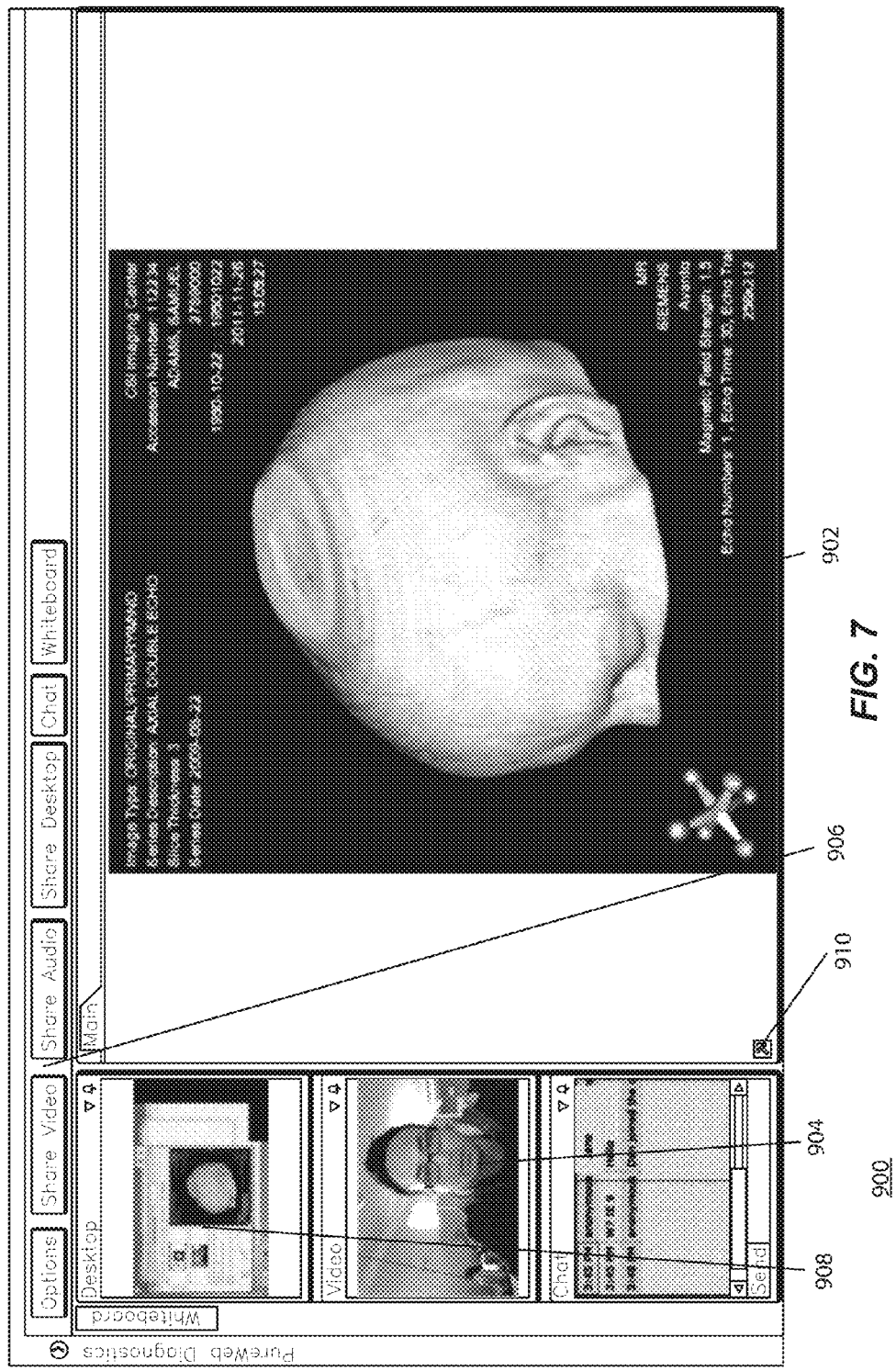
FIG. 7 illustrates an example user interface of a viewing-participant's client computing device during a collaborative conferencing session.

FIG. 7 illustrates an example user interface 900 of a viewing-participant's client computing device during a collaborative conferencing session. For example, the user interface 900 may include a view of the application program 902 (i.e., 107A/107B), a view of a shared video stream 904 and a view of shared media 908. Additionally, the view of a shared video stream 904 may include a plurality of shared video streams. Further, the user interface 900 may includes a plurality of views of shared media 908, and the shared media may come from the same and/or different sources. In addition, the user interface 900 may include a floating tool bar 906, which provides the participant with functional controls, such as, for example, activating the interactive digital surface layer, capturing an image of the participant's desktop (i.e., which may then be shared with the other participants in the collaborative session), etc. The interactive digital surface layer is operable to receive user input to collaboratively display annotations input by users during the sessions. The annotations may be made on any portion of the user interface 900, i.e., a view of the application program 902 (i.e., 107A/107B), a view of a shared video stream 904, a view of shared media 908, etc. The floating tool bar 906 may also provide the participant the option of sharing various media such as, for example, audio, video, desktop screen scrapes, text messages, etc. The user interface 900 may also include a swap view button or a full screen button 910, for example, in order to manipulate the displayed views. The user may also swap the various views by clicking and dragging the views on the user interface 900.

Figure 8:
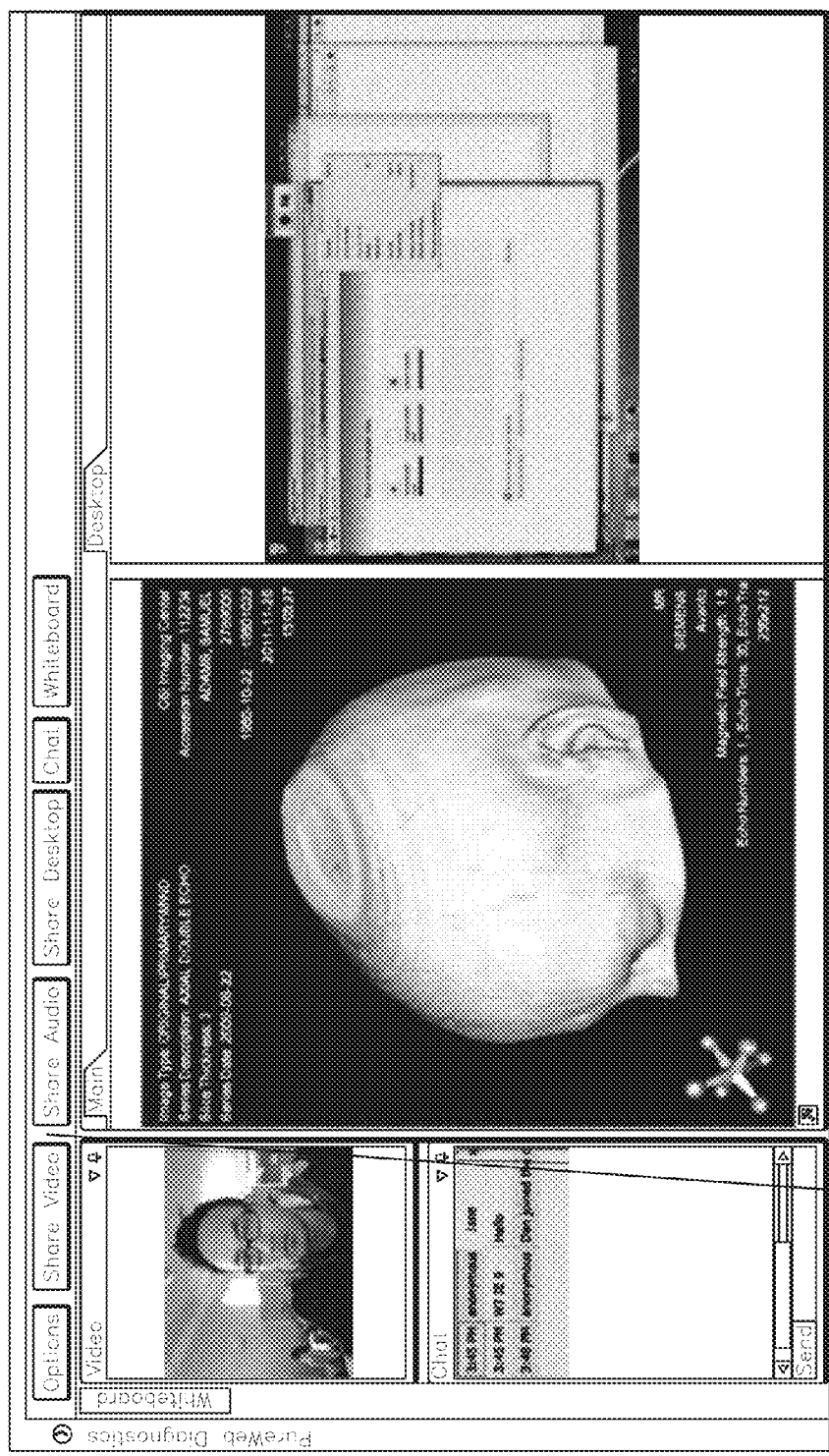
FIG. 8 illustrates an example user interface of a sharing-participant's client computing device during a collaborative conferencing session.

FIG. 8 illustrates an example user interface 1000 of a sharing-participant's client computing device during a collaborative conferencing session. The user interface 1000 includes a view of the desktop which the participant is sharing with the other participants in the collaborative session, as well as a floating tool bar 1006.

Figure 9:
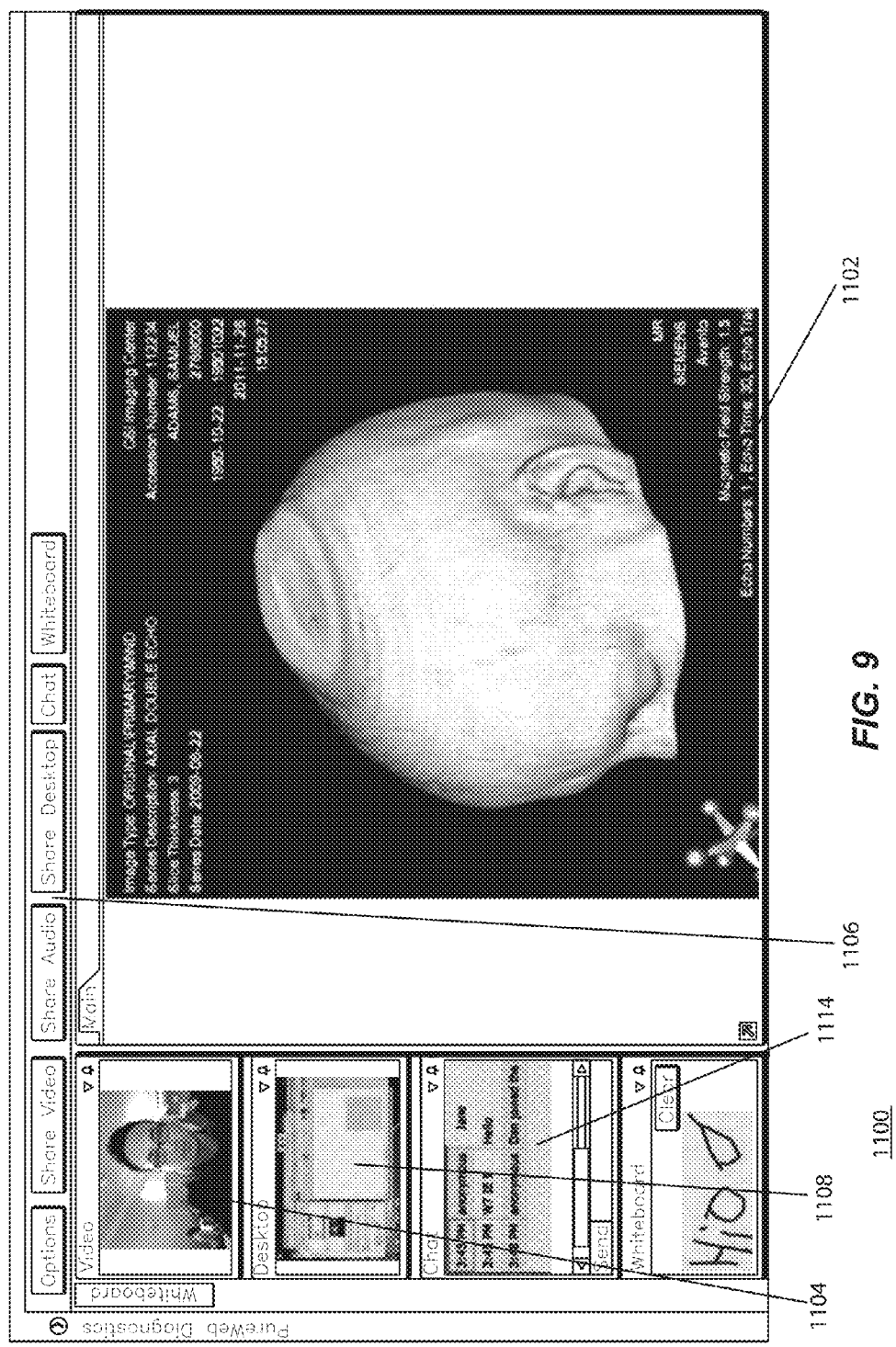
FIG. 9 illustrates a second example user interface of a viewing-participant's client computing device during a collaborative conferencing session.

FIG. 9 illustrates a second example user interface 1100 of a viewing-participant's client computing device during a collaborative conferencing session. Similarly to FIG. 7, the user interface 1100 includes a view of the application program 1102 (i.e., 107A/107B), a view of a shared video stream 1104 and a view of shared media 1108, as well as a floating tool bar 1106. In addition, the user interface 1100 includes a chat view 1114, which allows the participants in the collaborative session to engage in a real-time chat session.

Figure 10:
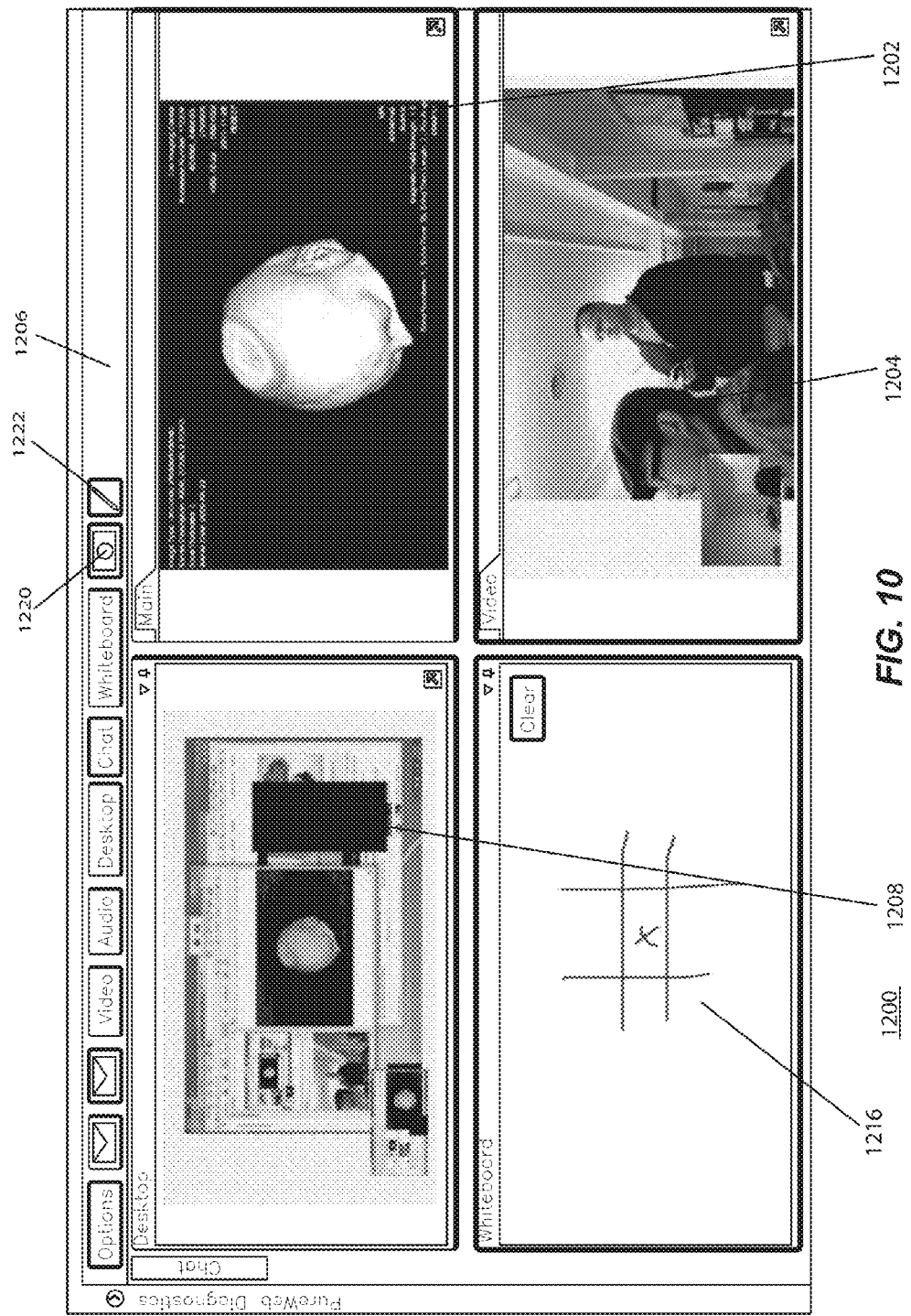
FIG. 10 illustrates a third example user interface of a viewing-participant's client computing device during a collaborative conferencing session.

FIG. 10 illustrates a third example user interface 1200 of a viewing-participant's client computing device during a collaborative conferencing session. Similarly to FIGS. 9 and 11, the user interface 1200 includes a view of the application program 1202 (i.e., 107A/107B), a view of a shared video stream 1204 and a view of shared media 1208, as well as a floating tool bar 1206. The tool bar 1206 may also include options for capturing a screen shot 1220 and/or activating the interactive digital surface layer 1222, for example. In addition, the user interface 1200 includes a view of an interactive digital surface layer on white background 1216. The annotations may be made on any portion of the user interface 1200, i.e., a view of the application program 1202 (i.e., 107A/107B), a view of a shared video stream 1204, a view of shared media 1208, a view of an interactive digital surface layer on white background 1216, etc. The white background may allow the participants to make annotations unobstructed by the displayed views. Alternatively or additionally, the white background 1216 may be a view of a whiteboard application to allow participants to draw/make notes on the whiteboard. The drawings/notes maybe captured and saved for later retrieval.

Figure 11:
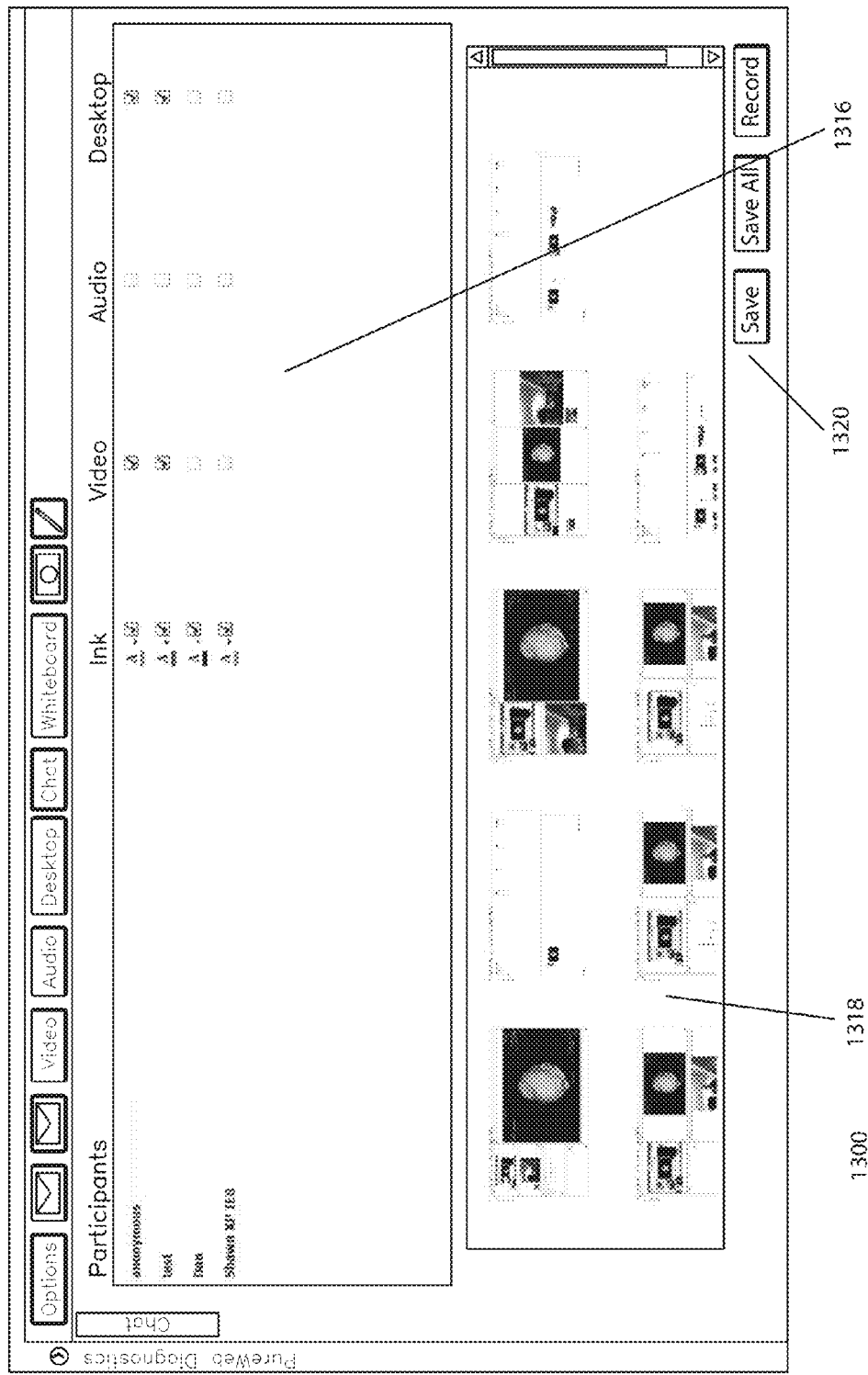
FIG. 11 illustrates an example user interface including a conferencing manager view of a sharing-participant's client computing device during a collaborative conferencing session.

FIG. 11 illustrates an example user interface 1300 including a conferencing manager view 1316 of a sharing-participant's client computing device during a collaborative conferencing session. For example, the conferencing manager view 1316 shows a list of participants in the collaborative session, the color of each participant's annotation, the type of media being shared by each participant (i.e., audio, video, desktop, for example), etc. The user interface 1300 may also include a view of all previous desktop captures 1318 from the collaborative session, as well as buttons for saving desktop captures 1320. In addition, there may be an option to close desktop sharing automatically upon saving captures.

The user interfaces of the present disclosure may be presented on any type of computing device participating within the collaborative conferencing session. Thus, to accommodate the various display areas of the devices that may participate in the collaborative conferencing session, implementations of the present disclosure may provide for refactoring of the display. As such, each type of device that is participating in the collaborative conferencing session presents the user interface having a device-appropriate resolution based on information contained in the state model 200. For example, with reference to the user interface of FIG. 7, if a display is associated with a desktop computer, the entire user interface 900 may be displayed. However, if a display is associated with a handheld mobile device, then a subset of the user interface 900 may be displayed, e.g., the view of the application program 902. The other views may be made available on the handheld mobile via a control provided in the display. Other refactoring schemes are possible depending on the views in the user interface and the device on which the user interface is to be displayed.

During a collaborative session, a user may wish to point to an area of the user interfaces without interacting with the underlying application program 107A/107B. For example, a user may be making a presentation of a slide deck and may wish to "point" to an item on the slide being displayed in the user interface. The interactive digital surface layer may be used to provide such an indication to other users in the collaborative session.

To accommodate the above, the sending of mouse cursor position data may be separated from the sending of mouse input events to the application 107A/107B so that the position and event data can be triggered independently of one another. As such, a cursor position tool may be directed to send cursor information without input events that would otherwise cause an interaction when the user of the tablet device 112N does not desire such interaction with the application program 107A/107B. The above may be achieved by separating a single method that updates the interactive digital surface layer for cursor position into two methods, one of which performs cursor position updates, and one of which queues the input events. Optionally or additionally, the mouse cursor may change characteristics when operating in such a mode. For example, where the mouse cursor is being used for indication purposes, the cursor may thicken, change color, change shape, blink, etc. to indicate to other users that the cursor is being used as an indicator.

While the above may be implemented for all types of client computers, a particular use case is where users of mobile devices having a touch-sensitive interface (e.g., tablet device 112N) wish to indicate to other users what he or she is currently viewing on the display. Typically, a touch of a tablet device represents an interaction with the application program 107A/107B. In accordance with the above, separating the mouse cursor position data (i.e., the touch location) from the sending of mouse input events (i.e., the actual touch) enables users of tablet devices 112N to make such an indication similar to client computers having a pointing device.

In another aspect that may be combined with the above or separately implemented, annotations can be created in the interactive digital surface layer without interacting with the underlying application program 107A/107B, and interactions with the underlying application program 107A/107B do not necessarily create annotations within the interactive digital surface layer. Therefore, the interactive digital surface layer control 1222 may be provided with an option to disable interaction with the underlying application 107A/107B.

Thus, as described above, the present disclosure provides for conferencing capability around a remotely-accessed collaborative application. More generally, the present disclosure provides systems and methods for allowing participants in a collaborative session to share media with the other participants in the collaborative session.

Figure 12:
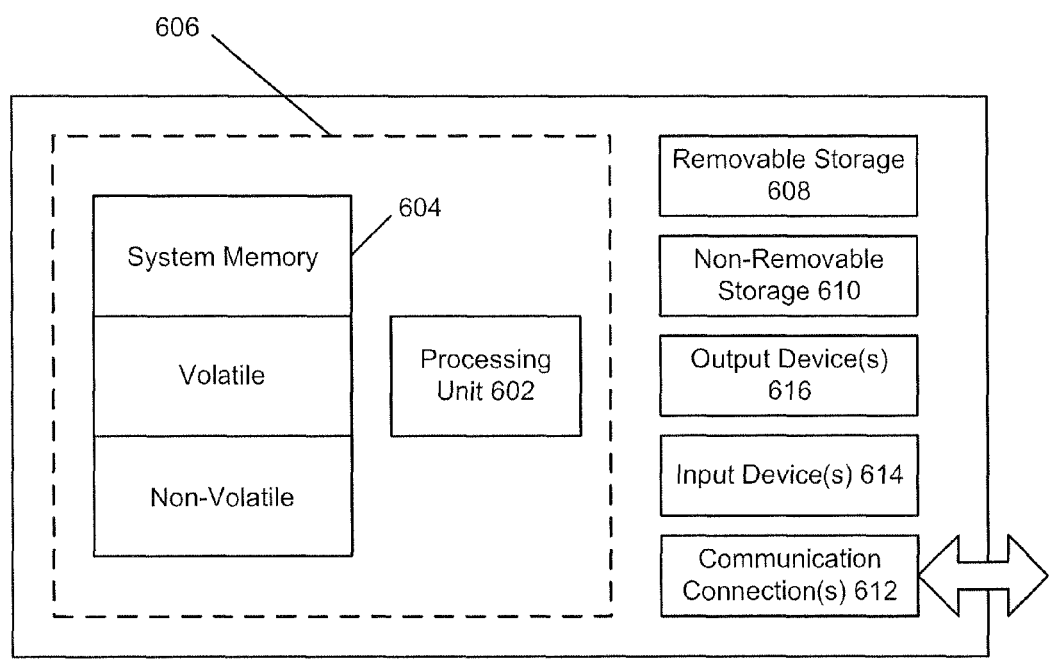
FIG. 12 illustrates an exemplary computing device.

FIG. 12 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 12, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 12 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 12 by removable storage 608 and non-removable storage 610.

Computing device 600 typically includes a variety of computer readable media. Computer readable media can be any available media that can be accessed by device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communications connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of providing a collaborative conferencing capability to a remotely accessed application, comprising:
   providing a tiered remote access framework comprising an application tier, a server tier and a client tier, the tiered remote access framework communicating first information regarding the remotely-accessed application between client computing devices accessing the remotely-accessed application within a state model that is used to display a view of the remotely-accessed application at the client computing devices, wherein the state model comprises an association of logical elements of the remotely-accessed application with corresponding states of the remotely-accessed application, wherein the logical elements are associated with user interface components of the remotely-accessed application;
   providing a server remote access application in the server tier, the server remote access application being capable of modifying the state model;
   providing a client remote access application in either the client tier or the application tier, the client remote access application being capable of modifying the state model;
   providing a client media sharing application in the client tier, the client media sharing application allowing at least one of the client computing devices to share media accessible by the at least one of the client computing devices;
   providing a conferencing manager application in the server tier, the conferencing manager application receiving media shared by the at least one of the client computing devices, wherein the shared media is not provided by the remotely-accessed application;
   providing a conferencing stub application in the server tier for each of the client computing devices, each conferencing stub application interfacing with the server remote access application to modify the state model, and
   modifying the state model to further include the shared media such that the shared media is provided in at least one of the client computing devices,
   wherein the client remote access application is configured to operate with the server remote access application in cooperation with the state model to interface with the conferencing manager application via the conferencing stub application.

2. The method of claim 1, the conferencing manager application receiving the shared media directly from the client media sharing application.

3. The method of claim 1, the conferencing manager application receiving the shared media indirectly from the client remote access application via the conferencing stub application.

4. The method of claim 1, the shared media being audio, video, images, desktop screen scrapes or text messages.

5. The method of claim 1, the shared media comprising media accessible by at least two of the client computing devices, and the shared media being simultaneously shared by the at least two of the client computing devices.

6. The method of claim 1, the conferencing manager application acting as a multiplexer by making the shared media from the at least one client computing device available to the each of the conferencing stub applications.

7. A non-transitory computer readable storage medium having computer-executable instructions stored thereon for providing a collaborative conferencing capability to a remotely accessed application in a tiered remote access framework comprising an application tier, a server tier and a client tier, the tiered remote access framework being configured to communicate first information regarding the remotely-accessed application between client computing devices accessing the remotely-accessed application within a state model that is used to display a view of the remotely-accessed application at the client computing devices, that, when executed by a computing device, cause the computing device to:

provide a server remote access application in the server tier, the server remote access application being capable of modifying the state model;

provide a conferencing manager application in the server tier, the conferencing manager application being capable of receiving shared media that is accessible to at least one of the client computing devices, wherein the shared media is not provided by the remotely-accessed application;

provide a conferencing stub application in the server tier for each of the client computing devices, each conferencing stub application interfacing with the server remote access application to modify the state model; and modify the state model to further include the shared media such that the shared media is provided in at least one of the client computing devices, wherein the state model comprises an association of logical elements of the remotely-accessed application with corresponding states of the remotely accessed application, wherein a client remote access application is configured to operate with the server remote access application in cooperation with the state model to interface with the conferencing manager application via the conferencing stub application, wherein the logical elements are associated with user interface components of the remotely-accessed application.

8. The non-transitory computer readable storage medium of claim 7, the conferencing manager application receiving the shared media directly from the client media sharing application.

9. The non-transitory computer readable storage medium of claim 7, the conferencing manager application receiving the shared media indirectly from a client remote access application via the conferencing stub application, the client remote access application being provided in either the client tier or the application tier.

10. The non-transitory computer readable storage medium of claim 7, the shared media comprising media accessible by at least two of the client computing devices, and the shared media being simultaneously shared by the at least two of the client computing devices.

11. The non-transitory computer readable storage medium of claim 7, the conferencing manager application acting as a multiplexer by making the shared media from the at least one client computing device available to the each of the conferencing stub applications.

\* \* \* \* \*